(12) United States Patent
Kang

(10) Patent No.: US 8,359,807 B2
(45) Date of Patent: Jan. 29, 2013

(54) PLATE PRODUCT USING NATURAL STONE FOR FLOOR AND WALL FINISHING

(75) Inventor: Kyoung-Taek Kang, Seoul (KR)

(73) Assignee: EasyTech Inc., Kyunggi-Do (KR)

( * ) Notice: Subject to any disclaimer, the term of this patent is extended or adjusted under 35 U.S.C. 154(b) by 38 days.

(21) Appl. No.: 12/808,345

(22) PCT Filed: Oct. 20, 2008

(86) PCT No.: PCT/KR2008/006205
§ 371 (c)(1),
(2), (4) Date: Jun. 15, 2010

(87) PCT Pub. No.: WO2009/142365
PCT Pub. Date: Nov. 26, 2009

(65) Prior Publication Data
US 2010/0300032 A1 Dec. 2, 2010

(30) Foreign Application Priority Data

May 20, 2008 (KR) .................. 10-2008-0046759
Oct. 8, 2008 (KR) .................. 10-2008-0098573

(51) Int. Cl.
*B65B 43/00* (2006.01)
*B67B 7/00* (2006.01)

(52) U.S. Cl. .................. 52/592.1; 52/392; 52/612

(58) Field of Classification Search .................. 52/596, 52/592.1, 612, 311.2, 796.1, 177, 589
See application file for complete search history.

(56) References Cited

U.S. PATENT DOCUMENTS

| | | | | |
|---|---|---|---|---|
| 1,625,187 A | * | 4/1927 | Birch | 52/177 |
| 4,287,693 A | * | 9/1981 | Collette | 52/177 |
| 4,840,825 A | * | 6/1989 | Aristodimou | 428/77 |
| 6,261,394 B1 | * | 7/2001 | Raineri | 156/63 |

(Continued)

FOREIGN PATENT DOCUMENTS

| KR | 2019980013062 U | 6/1998 |
|---|---|---|
| KR | 1020060062088 A | 6/2006 |

(Continued)

OTHER PUBLICATIONS

International Search Report for PCT/KR2008/006205 mailed Jun. 9, 2009.

(Continued)

*Primary Examiner* — Brian Glessner
*Assistant Examiner* — Paola Agudelo
(74) *Attorney, Agent, or Firm* — Meunier Carlin & Curfman, LLC

(57) ABSTRACT

A plate product for finishing a floor or wall is disclosed. The plate product includes a natural-stone surface plate which has a predetermined thickness and is cut to have a predetermined length and width. A reinforcing plate is cut to have a length and width corresponding to those of the natural-stone surface plate and attached to the lower surface of the surface plate. A base plate is cut to have a length and width which are larger than those of the natural-stone surface plate and attached to the lower surface of the reinforcing plate. The upper layer part of the base plate having a predetermined thickness is pushed horizontally at one lengthwise side surface and one widthwise end surface, and the lower layer part having a remaining thickness is pushed horizontally at the other lengthwise side surface and the other widthwise end surface.

8 Claims, 6 Drawing Sheets

U.S. PATENT DOCUMENTS

| | | | |
|---|---|---|---|
| 6,631,598 B2* | 10/2003 | Raineri | 52/385 |
| 7,536,835 B2* | 5/2009 | Schluter | 52/390 |
| 7,543,417 B2* | 6/2009 | McIntosh et al. | 52/589.1 |
| 7,836,651 B2* | 11/2010 | Krupnick | 52/392 |
| 7,845,122 B2* | 12/2010 | Sippola | 52/177 |
| 7,891,149 B2* | 2/2011 | Turner et al. | 52/385 |
| 8,082,704 B2* | 12/2011 | Stroppiana | 52/177 |
| 8,166,722 B2* | 5/2012 | Moller, Jr. | 52/588.1 |
| 2002/0124506 A1* | 9/2002 | Mercade | 52/390 |
| 2003/0154676 A1* | 8/2003 | Schwartz | 52/391 |
| 2005/0223672 A1* | 10/2005 | Ciccarello et al. | 52/607 |
| 2006/0156672 A1* | 7/2006 | Laurent et al. | 52/589.1 |
| 2007/0289236 A1* | 12/2007 | Choi | 52/311.2 |
| 2007/0289246 A1* | 12/2007 | Schmitz | 52/592.1 |
| 2008/0010930 A1* | 1/2008 | Mao | 52/403.1 |
| 2008/0092473 A1* | 4/2008 | Heyns | 52/385 |
| 2009/0223154 A1* | 9/2009 | Anderson | 52/309.1 |
| 2010/0129150 A1* | 5/2010 | Sippola | 404/42 |

FOREIGN PATENT DOCUMENTS

| | | |
|---|---|---|
| KR | 1020060102429 A | 9/2006 |
| KR | 100798126 B1 | 1/2008 |

OTHER PUBLICATIONS

Written Opinion of the International Searching Authority for PCT/KR2008/006205 mailed Jun. 9, 2009.

* cited by examiner

PLATE PRODUCT USING NATURAL STONE FOR FLOOR AND WALL FINISHING

TECHNICAL FIELD

The present invention relates, in general, to a plate product for finishing a floor or wall and, more particularly, to a plate product for finishing a floor or wall using natural stone such as marble or granite, thus imparting a natural texture thereto, reducing the load applied to a building owing to lightness of weight, and enabling easy construction.

BACKGROUND ART

Today, various types of natural stone such as marble or granite have been used in construction. Especially, natural stone is advantageous in that it is a nature-friendly material which can provide non-uniform natural beauty. Thus, in order to decorate a building luxuriously, natural stone has been commonly used as a material for finishing visible regions, that is, the outer wall, inner wall, or floor of the building.

Generally, construction is performed using natural stone manufactured in the form of a plate. However, natural stone is weak in compressive strength, impact strength and tensile strength. Particularly, natural stone in the form of a plate is very weak to impact, so that a plate having a thickness of from 10 mm to 30 mm, which may vary depending on the kind of natural stone, is generally used in consideration of the danger of damage resulting from the act of construction or in the use thereof.

However, although a thickness of from 10 mm to 30 mm is relatively thin, the density of natural stone is very high, so that a natural stone plate has a considerably heavy weight. The considerably heavy weight may impose a structural burden on a building. Thus, if a building is designed to be finished using natural stone, the load imparted thereby must be additionally considered at the design stage and be applied to the structural design, in addition to increasing the cost of foundation work.

Further, natural stone plates must be treated carefully at times of construction or conveyance. During the construction work, workers must pay careful attention to arrange plates in an orderly manner in vertical and horizontal directions, so that the construction is complicated and thus construction cost is considerable.

Because of the cost burden, natural stone is not used for general houses, but is mainly used for luxurious houses entailing high building costs.

DISCLOSURE OF INVENTION

Technical Problem

Accordingly, the present invention has been made keeping in mind the above problems occurring in the prior art, and an object of the present invention is to provide a plate product for finishing a floor or wall, which uses nature-friendly natural stone, thus giving the same feel as a general natural-stone plate, and which reduces a weight so that it is unnecessary to additionally consider the weight at the design stage, thus being easy to handle in terms of the conveyance or construction work, and enabling easy construction, therefore allowing the plate product to be popularly used.

Technical Solution

In order to accomplish the above object, the present invention provides a floor or wall finishing plate product using natural stone, including a natural-stone surface plate having a predetermined thickness, and cut to have a predetermined length and width; a reinforcing plate cut to have a length and width corresponding to those of the natural-stone surface plate, and attached to a lower surface of the natural-stone surface plate; and a base plate cut to have a length and width which are larger than those of the natural-stone surface plate and attached to a lower surface of the reinforcing plate, an upper layer part of the base plate having a predetermined thickness being pushed horizontally at a first lengthwise side surface and a first widthwise end surface, a lower layer part having a remaining thickness being pushed horizontally at a second lengthwise side surface and a second widthwise end surface. The first lengthwise side surface and the first widthwise end surface comprise a side receiving part and an end receiving part which are recessed horizontally under the reinforcing plate, and the second lengthwise side surface and the second widthwise end surface comprise a side protruding part and an end protruding part which protrude horizontally under the reinforcing plate. Further, the side protruding part is coupled to the side receiving part and the end protruding part is coupled to the end receiving part, so that finishing plate products are continuously horizontally coupled to each other in lengthwise and widthwise directions.

The reinforcing plate may be selected from among the group consisting of an aluminum composite plate having a plastic plate and two aluminum plates attached to upper and lower surfaces of the plastic plate, a fiber glass board, a cellulose fiber reinforced cement (CRC) board, a magnesium board, and a urethane foam board.

The base plate may have a honeycomb structure including a plurality of rectangular recesses or hexagonal recesses which open downwards, except for on a predetermined portion of an edge of the base plate.

The base plate may have a honeycomb structure including a plurality of rectangular recesses or hexagonal recesses which open upwards, except for on a predetermined portion of an edge of the base plate.

The base plate may have a honeycomb structure including a plurality of rectangular recesses or hexagonal recesses which open both upwards and downwards, except for on a predetermined portion of an edge of the base plate.

The base plate may have a honeycomb structure including a plurality of rectangular recesses or hexagonal recesses which open upwards, except for on a predetermined portion of an edge of the base plate.

The base plate may have a honeycomb structure including a plurality of rectangular recesses or hexagonal recesses which open both upwards and downwards, except for on a predetermined portion of an edge of the base plate.

The base plate may be provided with a plurality of vent holes which are arranged according to a predetermined arranging rule in such a way as to penetrate vertically.

Further, the present invention provides a floor or wall finishing plate product using natural stone, including a natural stone surface plate having a predetermined thickness, and cut to have a predetermined length and width; a reinforcing plate cut to have a length and width corresponding to those of the natural stone surface plate, and attached to a lower surface of the natural stone surface plate; and a base plate cut to have a length and width which are larger than those of the natural stone surface plate and attached to a lower surface of the reinforcing plate, the base plate comprising a side receiving part and an end receiving part which are recessed horizontally in a first lengthwise side surface and a first widthwise end surface, and comprising a side protruding part and an end protruding part which protrude horizontally from a second lengthwise side surface and a second widthwise end surface. The side protruding part is coupled to the side receiving part and the end protruding part is coupled to the end receiving part, so that finishing plate products are continuously horizontally coupled to each other in lengthwise and widthwise directions.

The reinforcing plate may be selected from among the group consisting of an aluminum composite plate having a plastic plate and two aluminum plates attached to upper and lower surfaces of the plastic plate, a fiber glass board, a cellulose fiber reinforced cement (CRC) board, a magnesium board, and a urethane foam board.

The base plate may be selected from among the group consisting of plywood, high density fiber board, particleboard, and synthetic wood board.

The base plate may be made of ABS resin or melamine resin and formed through injection molding.

Each of the side receiving part and the end receiving part may be formed to be surrounded by an upper wall, a side wall and a lower wall, the upper wall being positioned further inside than the lower wall.

Each of the side receiving part and the end receiving part may be formed such that a section of a predetermined dimension with the upper wall eliminated and a section of a predetermined dimension with the lower wall eliminated repeatedly alternate with each other.

The base plate may have a honeycomb structure including a plurality of rectangular recesses or hexagonal recesses which open downwards, except for on a predetermined portion of an edge of the base plate.

The base plate may have a honeycomb structure including a plurality of rectangular recesses or hexagonal recesses which open upwards, except for on a predetermined portion of an edge of the base plate.

The base plate may have a honeycomb structure including a plurality of rectangular recesses or hexagonal recesses which open both upwards and downwards, except for on a predetermined portion of an edge of the base plate.

The base plate may be provided with a plurality of vent holes which are arranged according to a predetermined arranging rule in such a way as to penetrate vertically.

Advantageous Effects

According to the present invention, a floor or wall finishing plate product using natural stone has the same texture as a natural stone plate, reduces a load applied to a building owing to its considerable lightness of weight, and enables easy construction unlike a conventional complicated construction method involving a natural stone plate, thus obtaining the effect of a natural stone plate at a low cost. Moreover, the present invention remarkably increases low impact strength, compressive strength and tensile strength which detract from the qualities of a natural stone plate, thus considerably reducing the danger of damage resulting from careless treatment during conveyance and construction.

Further, as a natural stone plate becomes thin, precise side machining is possible. The plate product of this invention is provided with a base plate which is made of a plastic material through precision injection molding in such a way that the base plate includes a side receiving part and a side protruding part, thus allowing neighboring plate products to be coupled to each other without a difference in gap or height formed between the plate products. Further, unlike the conventional plate product, it is unnecessary to insert a joint between plates, thus preventing undesirable contamination and separation.

Figure 1:
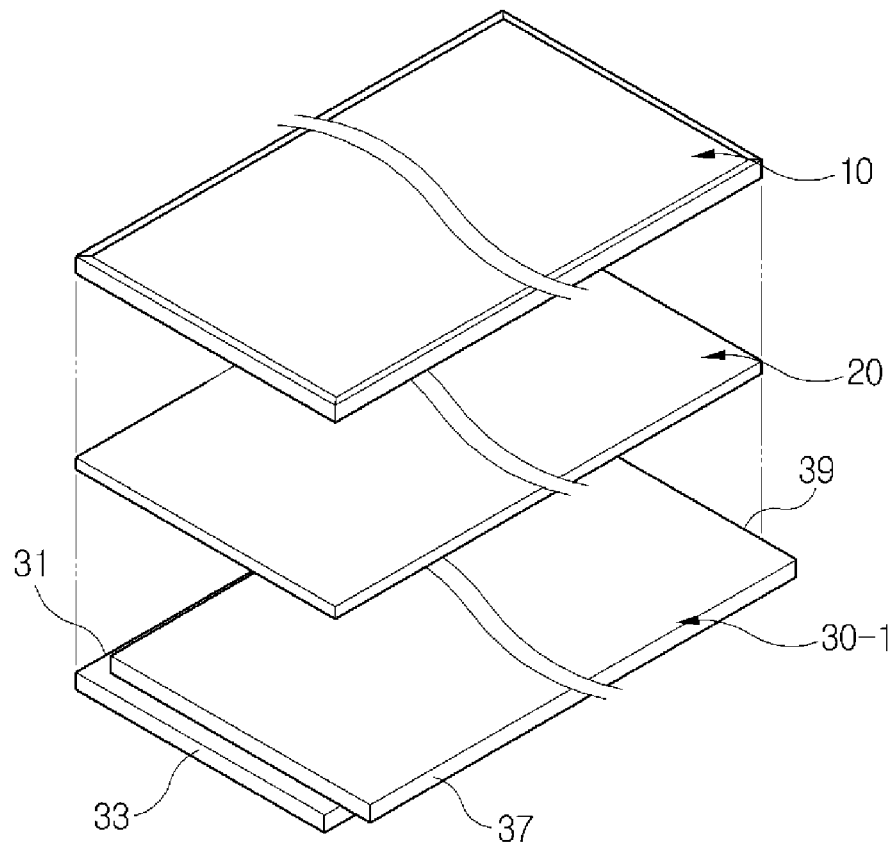
FIG. 1 is an exploded perspective view illustrating a finishing plate product according to a first embodiment of the present invention.

Description of Reference Characters of Important Parts
10: natural-stone surface plate 20, 20': reinforcing plate
30-1, 30-2, 30-3, 30-4, 30-5, 30-6, 30-7: base plate
31: one side surface 33: one end surface
37: the other side surface 39: the other end surface
40-1, 40-2, 40-3, 40-4: side receiving part
43: side downwardly inclined groove
45-1, 45-2, 45-3: side protruding part
47: side downward projection
50-1, 50-3, 50-4: end receiving part
55-1, 55-3: end protruding part
65, 65-1: rectangular recess
75, 75-1, 75-2: hexagonal recess
81: upper wall 82: side wall
83: lower wall 85: upper wall eliminated section
87: lower wall eliminated section 95: vent hole Mode for the Invention Hereinafter, the preferred embodiments of the present invention will be described in detail with reference to the accompanying drawings.

Figure 2:
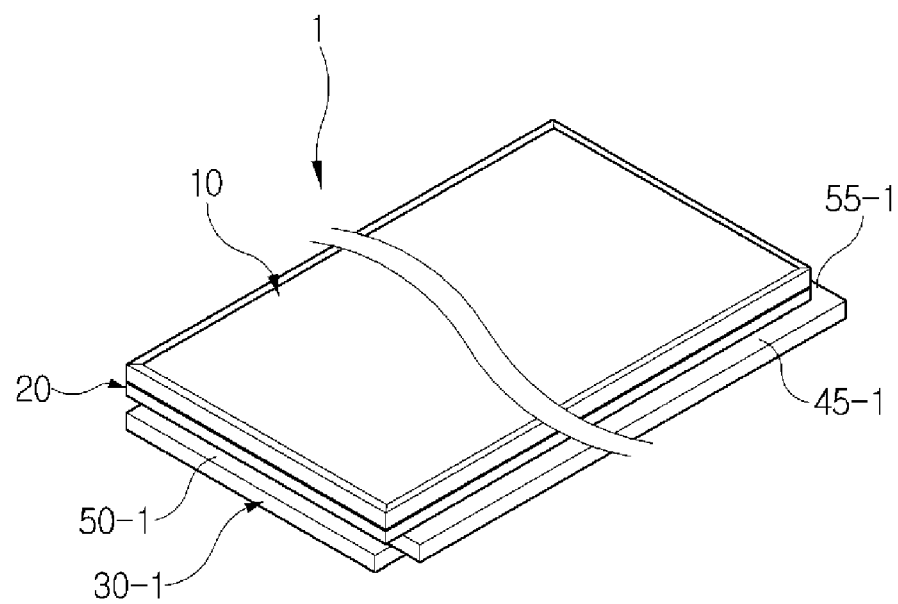
FIG. 2 is a perspective view illustrating the finishing plate product of FIG. 1.
Figure 3:
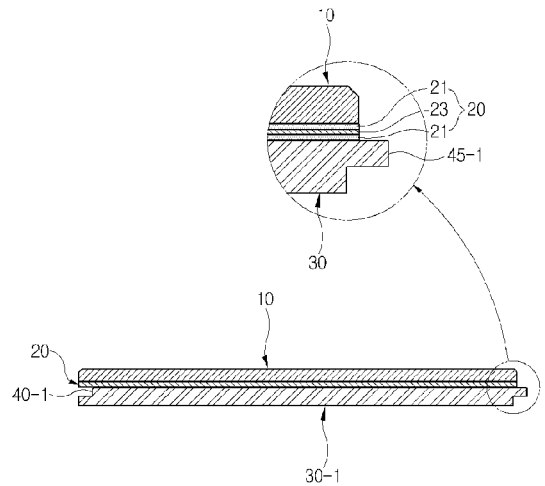
FIG. 3 is a widthwise sectional view illustrating the finishing plate product of FIG. 1.
Figure 4:
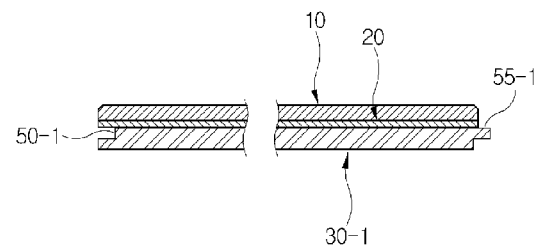
FIG. 4 is a lengthwise sectional view illustrating the finishing plate product of FIG. 1.

FIG. 1 is an exploded perspective view illustrating a finishing plate product according to a first embodiment of the present invention, FIG. 2 is a perspective view illustrating the finishing plate product of FIG. 1, FIG. 3 is a widthwise sectional view illustrating the finishing plate product of FIG. 1, and FIG. 4 is a lengthwise sectional view illustrating the finishing plate product of FIG. 1.

As shown in FIGS. 1 and 2, the floor or wall finishing plate product using natural stone according to the first embodiment of the present invention includes a natural-stone surface plate product 10 which has a predetermined thickness and is cut to have a predetermined length and width, a reinforcing plate 20 which is cut to have length and width corresponding to those of the natural-stone surface plate and is attached to the lower surface of the natural stone surface plate product 10, and a base plate 30-1 which is cut so as to have a length and width that are larger than those of the natural stone surface plate product 10 and is attached to the lower surface of the reinforcing plate 20. The natural stone surface plate product 10, the reinforcing plate 20 and the base plate 30-1 are adhered to each other by applying an adhesive to contact portions of the plates, so that the plates are integrated into a single structure. In detail, a moisture-curing urethane adhesive (one kind of hotmelt adhesive) is coated at 100 to 150 g/ using a hotmelt applicator, or a cold-pressure adhesive containing vinyl acetate and an isocyanate-based curing agent is coated at 100 to 150 g/. Next, the applied adhesive is pressed under the pressure of about 3~5 kg/cm2 for 30 to 60 minutes using a roll press machine or hydraulic cold press, and thereafter is allowed to stand at normal temperature for about 48 hours, so that the adhesive is completely cured and thus the plates are integrated into a single structure.

The natural stone surface plate product 10 is made of a natural stone plate such as marble or granite, and is machined to have the thickness of about 3 to 5 mm. Here, the surface plate may assume a variety of lengths and widths. Preferably, the corners of the upper surface of the surface plate are chamfered so as to prevent the surface plate from being broken or damaged during the treatment of the surface plate for conveyance or construction.

The reinforcing plate 20 functions to increase the impact strength, compressive strength, and tensile strength of the natural stone surface plate product 10. As shown in FIG. 3, the reinforcing plate may comprise an aluminum composite plate which includes a plastic plate 23 such as PE and two aluminum plates 21 attached to the upper and lower surfaces of the plastic plate. Here, by applying an adhesive to the contact portions of the plastic plate 23 and the aluminum plates 21, the plates are integrated into the aluminum composite plate. Such a reinforcing plate 20 remarkably improves the impact strength, compressive strength and tensile strength of the natural stone surface plate product 10, thus allowing the completed floor or wall finishing plate product using the natural stone to have sufficient durability.

Further, the base plate 30-1 may be made of a wood board such as plywood, high density fiber board, particleboard or synthetic wood board, and may be divided into upper and lower layer parts. In detail, the upper layer part occupying a predetermined thickness of the base plate is pushed horizontally at one lengthwise side surface 31 and one widthwise end surface 33, while the lower layer part occupying the remaining thickness is pushed horizontally at the other lengthwise side surface 37 and the other widthwise end surface 39.

Thus, as shown in FIGS. 2 to 4, the floor or wall finishing plate product 1 using natural stone according to the present invention which has been assembled into a single structure is provided with a side receiving part 40-1 and an end receiving part 50-1 which are recessed horizontally in one lengthwise side surface 31 and one widthwise end surface 33 under the reinforcing plate 20. The plate product is also provided with a side protruding part 45-1 and an end protruding part 55-1 which protrude horizontally from the other lengthwise side surface 37 and the other widthwise end surface 39 under the reinforcing plate 20.

Further, the construction of the floor or wall finishing plate product 1 using natural stone according to the present invention is performed by continuously horizontally fitting the side protruding part 45-1 into the side receiving part 40-1 and fitting the end protruding part 55-1 into the end receiving part 50-1 in lengthwise and widthwise directions.

Figure 5:
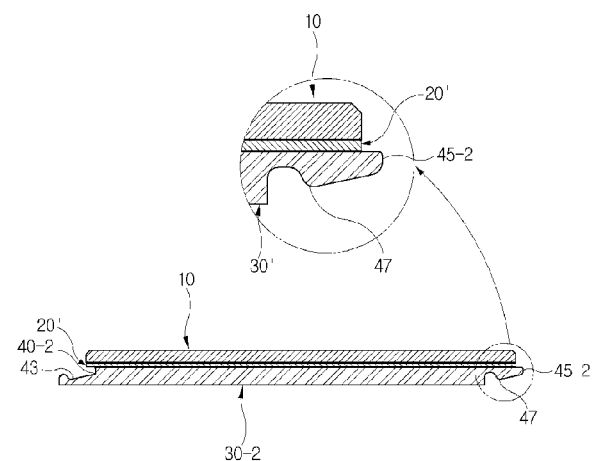
FIG. 5 is a widthwise sectional view illustrating a finishing plate product according to a second embodiment of the present invention and corresponding to FIG. 3.

FIG. 5 is a widthwise sectional view illustrating a finishing plate product according to a second embodiment of the present invention and corresponding to FIG. 3.

As shown in FIG. 5, the floor or wall finishing plate product using natural stone according to the second embodiment of the present invention is different from that of the first embodiment in that it includes a reinforcing plate 20' which is made of a single material selected from among a fiber glass board, a cellulose fiber reinforced cement (CRC) board, a magnesium board, and a urethane foam board.

Further, the plate product is provided with a side receiving part 40-2 and a side protruding part 45-2 which are modified. In detail, the side protruding part 45-2 is provided with a side downward projection 47 which gradually protrudes downwards, and the side receiving part 40-2 is provided with a side downwardly inclined groove 43 which corresponds to the side downward projection 47 to receive the side downward projection. The side downward projection 47 and the side downwardly inclined groove 43 function to prevent widthwise movement between finishing plate products which are continuously coupled to each other, thus stably supporting the finishing plate products.

However, the end receiving part 50-1 and the end protruding part 55-1 according to the second embodiment remain the same as the first embodiment. Such a construction allows one finishing plate product to be in close contact with and coupled to a neighboring finishing plate product in a lengthwise direction, after a widthwise coupling operation has been performed by inserting the side protruding part 45-2 into the side receiving part 40-2.

Figure 6:
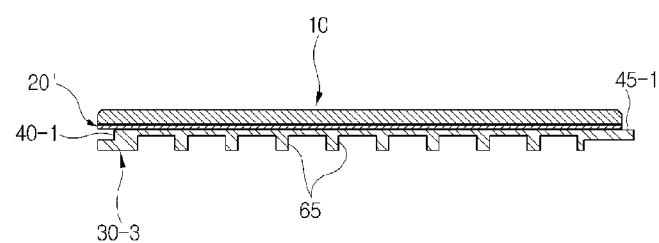
FIG. 6 is a widthwise sectional view illustrating a finishing plate product according to a third embodiment of the present invention and corresponding to FIG. 3.
Figure 7:
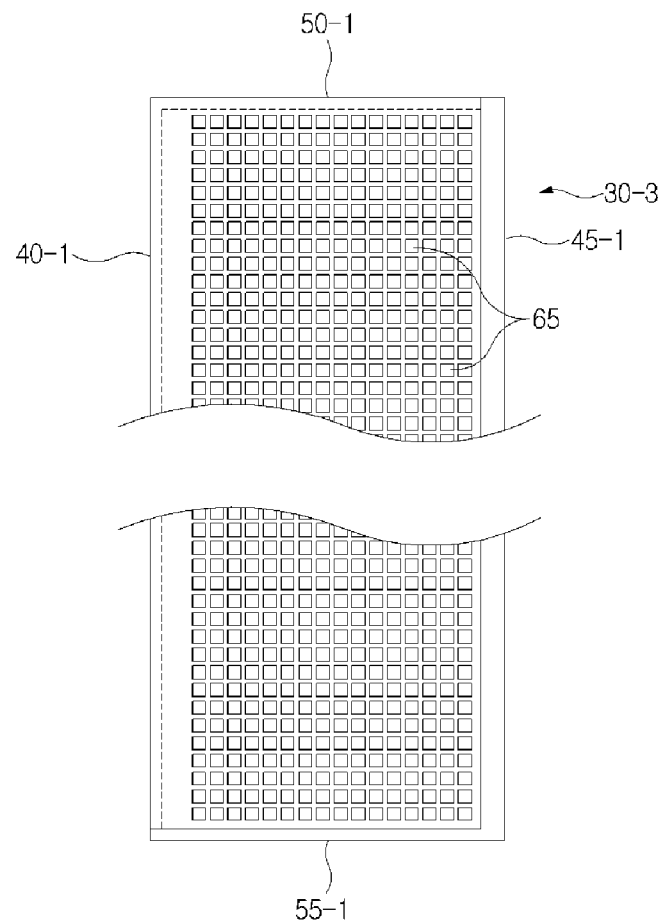
FIG. 7 is a bottom view illustrating the base plate of the finishing plate product of FIG. 6.
Figure 8:
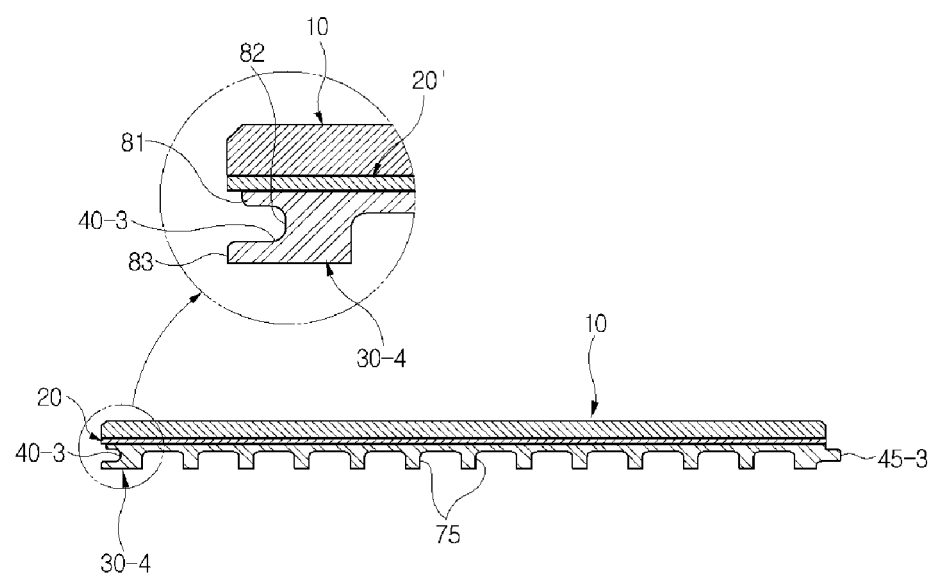
FIG. 8 is a widthwise sectional view illustrating a finishing plate product according to a fourth embodiment of the present invention and corresponding to FIG. 3.
Figure 9:
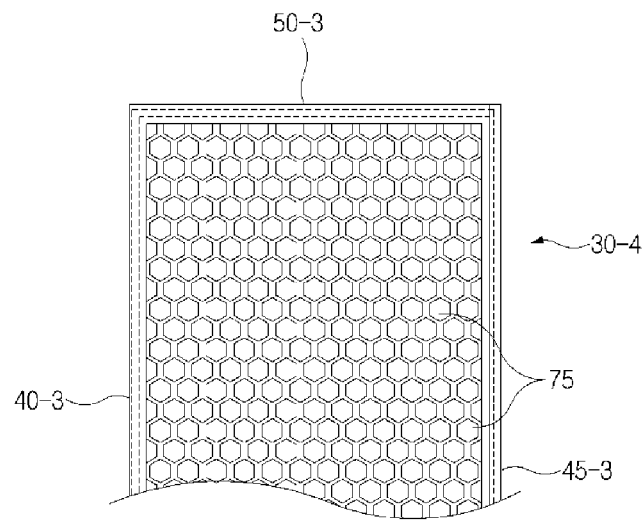
FIG. 9 is a bottom view illustrating the base plate of the finishing plate product of FIG. 8.
Figure 9:
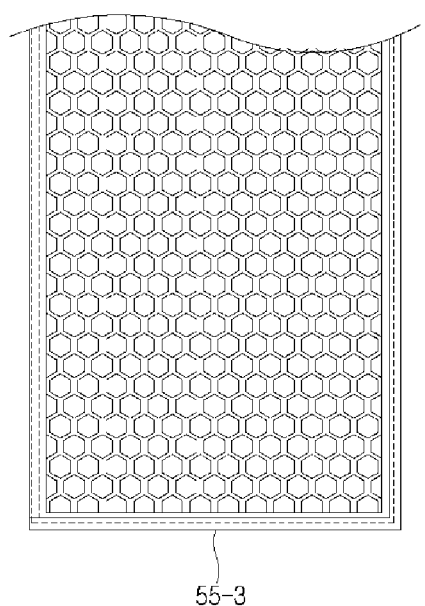

FIG. 6 is a widthwise sectional view illustrating a finishing plate product according to a third embodiment of the present invention and corresponding to FIG. 3, and FIG. 7 is a bottom view illustrating the base plate of the finishing plate product of FIG. 6. FIG. 8 is a widthwise sectional view illustrating a finishing plate product according to a fourth embodiment of the present invention and corresponding to FIG. 3, and FIG. 9 is a bottom view illustrating the base plate of the finishing plate product of FIG. 8.

As shown in FIGS. 6 and 7, the floor or wall finishing plate product using natural stone according to the third embodiment of the present invention is different from those of the first and second embodiments in that it includes a base plate 30-3 which is manufactured using ABS resin or melamine resin through injection molding.

Further, the base plate 30-3 is formed in a honeycomb structure having a plurality of rectangular recesses 65 which open downwards, except for on a predetermined portion of an edge.

The floor or wall finishing plate product using natural stone according to the fourth embodiment of the present invention is identical with the third embodiment in that a base plate 30-4 is manufactured using ABS resin or melamine resin through injection molding. However, unlike the third embodiment, as shown in FIGS. 8 and 9, the base plate 30-4 is formed in a honeycomb structure having a plurality of hexagonal recesses 75 which open downwards, except for on a predetermined portion of an edge.

As such, if the base plate 30-3 or 30-4 comprising an injection molded product is used, a wet construction method using cement as well as a dry construction method using wood board may be used. Further, the honeycomb structure having the plurality of rectangular recesses 65 or hexagonal recesses 75 can remarkably reduce the consumption of raw materials, thus realizing lightness and reducing manufacturing cost, in addition to increasing structural strength. Further, the honeycomb structure has an additional advantage in that it mitigates impact and prevents noise transmitted through a floor when the plate product is used to finish a floor.

Meanwhile, the floor or wall finishing plate product using natural stone according to the fourth embodiment of the present invention is different from those of the first to third embodiments in that the base plate 30-4 has a side receiving part 40-3 and an end receiving part 50-3 of independent shapes. That is, as shown in FIG. 1, the upper layer part of the base plate 30-1 is pushed at one lengthwise side surface 31 and one widthwise end surface 33, and the base plate is attached to the reinforcing plate 20, thus forming the side receiving part 40-1 and the end receiving part 50-1. However, unlike the base plate 30-1, the base plate 30-4 has the side receiving part 40-3 and the end receiving part 50-3 of independent shapes.

In detail, as shown in FIG. 8, each of the side receiving part 40-3 and the end receiving part 50-3 according to this embodiment is formed to be surrounded by an upper wall 81, a side wall 82 and a lower wall 83. Preferably, the upper wall 81 is positioned further inside than the lower wall 83. In order to correspond to the side receiving part 40-3 and the end receiving part 50-3, a side protruding part 45-3 and an end protruding part 55-3 protrude horizontally from the other lengthwise side surface and the other widthwise end surface at slightly lower positions.

The modified side receiving part 40-3 and end receiving part 50-3 of the floor or wall finishing plate product using natural stone according to the fourth embodiment of the present invention may be identically applied to the base plate made of the above-mentioned wood board as well as the base plate 30-4 made of ABS or melamine resin.

Figure 10:
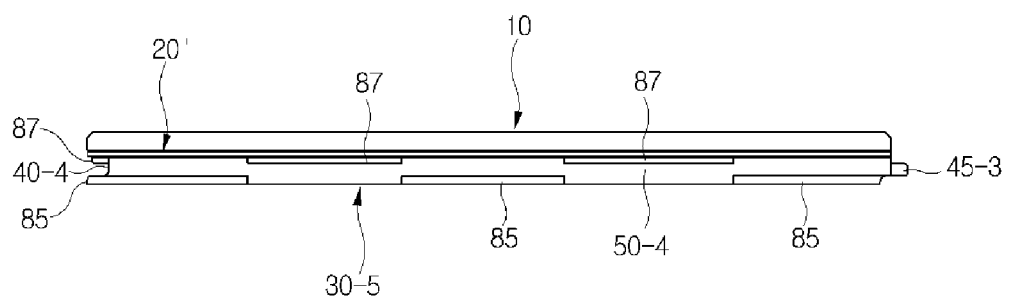
FIG. 10 is a widthwise side view illustrating a finishing plate product according to a fifth embodiment of the present invention.
Figure 11:
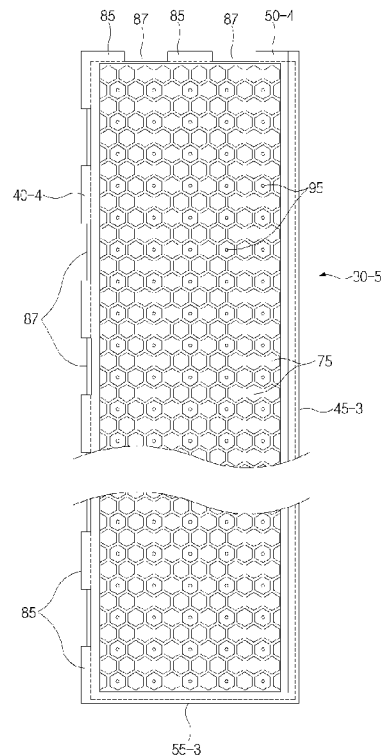
FIG. 11 is a bottom view illustrating the base plate of the finishing plate product of FIG. 10.

FIG. 10 is a widthwise side view illustrating a finishing plate product according to a fifth embodiment of the present invention, and FIG. 11 is a bottom view illustrating the base plate of the finishing plate product of FIG. 10.

The floor or wall finishing plate product using natural stone according to the fifth embodiment of the present invention is provided with a side receiving part 40-4 and an end receiving part 50-4 which are different from those of the fourth embodiment. That is, each of the side receiving part 40-4 and the end receiving part 50-4 is formed such that an upper wall eliminated section 85 which is formed by eliminating an upper wall and has a predetermined unit dimension repeatedly alternates with a lower wall eliminated section 87 which is formed by eliminating a lower wall and has a predetermined unit dimension. The side receiving part 40-4 and the end receiving part 50-4 formed in this way do not require a sliding process, thus considerably reducing the cost of a product and increasing productivity, unlike the third and fourth embodiments which essentially require a sliding process during injection molding, thus increasing the cost of a product and limiting productivity. However, a side protruding part 45-3 and an end protruding part 55-3 remain the same as those of the fourth embodiment.

Moreover, the floor or wall finishing plate product using natural stone according to the fifth embodiment of the present invention is different from that of the fourth embodiment in that a base plate 30-5 is provided with a plurality of vent holes 95 which pass vertically through the central portions of some of the rectangular recesses or hexagonal recesses 75. The vent holes 95 may be arranged according to a predetermined arranging rule. That is, each of the rectangular recesses or hexagonal recesses may have one vent hole. However, it is preferable that a proper number of vent holes be arranged at predetermined intervals. The vent holes 95 function to promote the complete curing of a moisture-curing urethane hotmelt adhesive which is used to adhere the base plate 30-5 to the reinforcing plate 20'. If the base plate is made of a wood material containing moisture, the vent holes may not be required. However, when the base plate is made of an ABS or melamine resin material, it does not contain moisture in view of the characteristics of the material, so that moisture is not supplied to the moisture-curing urethane hotmelt adhesive between the base plate and the reinforcing plate and thus curing is not reliable. That is, vapor laden in the air is supplied through the vent holes 95 to the moisture-curing urethane hotmelt adhesive between the base plate 30-5 and the reinforcing plate 20', thus completely curing the moisture-curing urethane hotmelt adhesive, therefore enhancing adhesive force.

Figure 12:
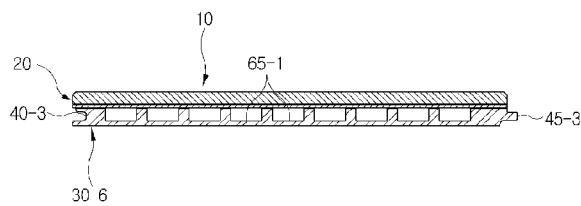
FIG. 12 is a widthwise sectional view illustrating a finishing plate product according to a sixth embodiment of the present invention and corresponding to FIG. 3.
Figure 13:
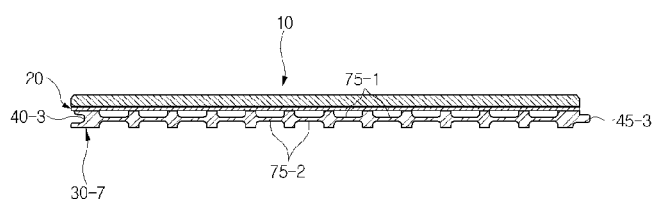
FIG. 13 is a widthwise sectional view illustrating a finishing plate product according to a seventh embodiment of the present invention and corresponding to FIG. 3.

FIG. 12 is a widthwise sectional view illustrating a finishing plate product according to a sixth embodiment of the present invention and corresponding to FIG. 3, and FIG. 13 is a widthwise sectional view illustrating a finishing plate product according to a seventh embodiment of the present invention and corresponding to FIG. 3.

The floor or wall finishing plate product using natural stone according to the sixth embodiment of the present invention is identical to that of the third embodiment in that it it includes a base plate 30-6 manufactured using an ABS or melamine resin material through injection molding. However, as shown in FIG. 12, the base plate 30-6 according to this embodiment is formed to have a honeycomb structure having a plurality of rectangular recesses 65-1 which open upwards, unlike those of the third embodiment which open downwards, except for on a predetermined portion of the edge. This evenly balances the finishing plate product which is manufactured using several different kinds of materials to have an integrated structure, thus making it more convenient to perform construction work.

The floor or wall finishing plate product using natural stone according to the seventh embodiment of the present invention is identical to that of the fourth embodiment in that it includes a base plate 30-7 manufactured using an ABS or melamine resin material through injection molding. However, as shown in FIG. 13, the base plate 30-7 according to this embodiment is formed to have a honeycomb structure having a plurality of hexagonal recesses 75-1 and 75-2 which open upwards and downwards, unlike those of the fourth embodiment which open downwards, except for on a predetermined portion of an edge.

Similarly to the floor or wall finishing plate product using natural stone according to the third or fourth embodiment of the present invention, the floor or wall finishing plate product using natural stone according to the sixth or seventh embodiment of the present invention may be applied to the wet construction method as well as the dry construction method. Further, the plate product is provided with a honeycomb structure having a plurality of rectangular recesses 65-1 or hexagonal recesses 75-1 and 75-2, thus considerably reducing the consumption of material, therefore realizing lightness of weight and reducing the cost, in addition to increasing structural strength. Further, the honeycomb structure mitigates impact and prevents noise from being transmitted through a floor when the plate product is used as a floor finishing material.

Furthermore, the base plate 30-6 or 30-7 of the floor or wall finishing plate product using natural stone according to the sixth or seventh embodiment of the present invention retains the above-mentioned advantages, and has the honeycomb structure having the rectangular recesses 65-1 which open upwards or the hexagonal recesses 75-1 and 75-2, thus reducing a contact area between the reinforcing plate and the base plate which have different thermal expansion rates, thereby minimizing the entire deformation of the finishing plate product due to the difference in thermal expansion rate even when the plate product is applied to an underfloor-heating room and subjected to heat.

Meanwhile, the base plate 30-6 or 30-7 of the floor or wall finishing plate product using natural stone according to the sixth or seventh embodiment of the present invention may have a characteristic construction such as the vent holes 95 of the fifth embodiment.

The honeycomb structure applied to base plate of the floor or wall finishing plate product using natural stone according to the sixth or seventh embodiment of the present invention is similar to that of the third or fourth embodiment except that it opens upwards or opens both upwards and downwards, so that the honeycomb structure of the sixth or seventh embodiment is not shown in an additional drawing.

Hereinafter, the construction method using the floor or wall finishing plate product using natural stone according to the present invention will be described.

Figure 14:
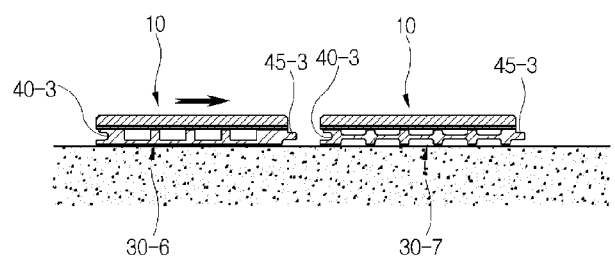
FIG. 14 is a view illustrating an example of the construction method of the finishing plate product according to the present invention.
Figure 15:
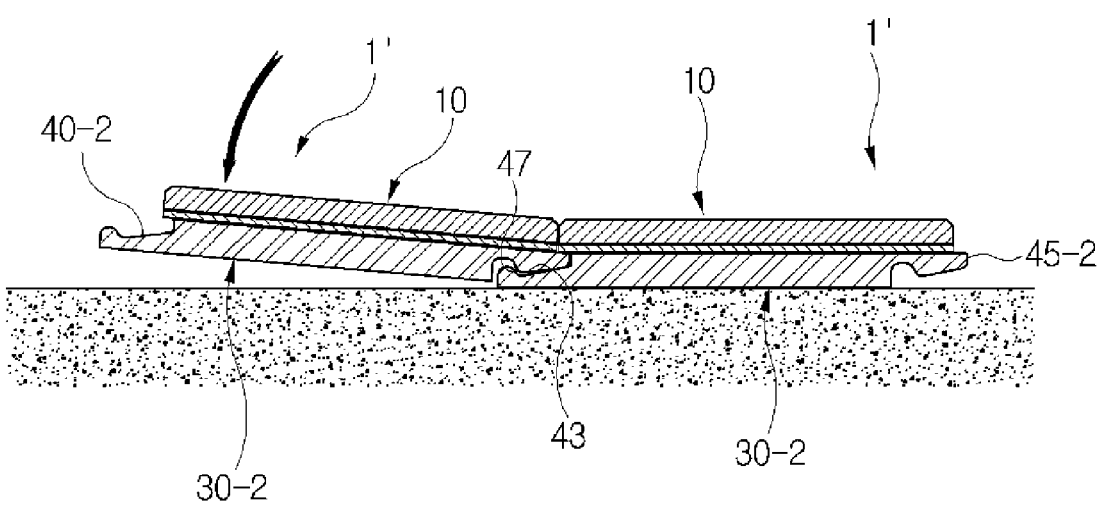
FIG. 15 is a view illustrating another example of the construction method of the finishing plate product according to the present invention.

FIG. 14 is a view illustrating an example of the construction method of the finishing plate product according to the present invention, and FIG. 15 is a view illustrating another example of the construction method of the finishing plate product according to the present invention.

The floor or wall finishing plate product using natural stone according to the present invention is continuously installed using a horizontal coupling structure between the side receiving part 40-1 and the side protruding part 50-1. That is, as shown in FIG. 14, the floor or wall finishing plate product using natural stone according to the first embodiment having the simple side receiving part 40-1 and side protruding part 45-1 is continuously coupled to a neighboring plate product by horizontally pushing the side protruding part 45-1 of a subsequent finishing plate product into the side receiving part 40-1 of the finishing plate product which was previously installed. After such a widthwise coupling operation is performed, a lengthwise coupling operation is performed by pushing the end protruding part 55-1 of the subsequent finishing plate product into the end receiving part 50-1 of the neighboring finishing plate product which was previously installed. In this way, the installation of the finishing plate product is completed. Here, the dry construction method of applying an adhesive to a floor surface and a wall surface may be used.

Meanwhile, when the base plate comprises the ABS resin molded plate 30-3, 30-4 or 30-5, as described above, the wet construction method using cement as well as the dry construction method may be used.

Further, as shown in FIG. 15, the floor or wall finishing plate product 1' using natural stone according to the second embodiment having the modified side receiving part 40-2 and side protruding part 45-2 is installed by tilting a subsequent plate product and making it approach the side receiving part 40-2 of a finishing plate product which was previously installed so that the side receiving part contacts the side protruding part 45-2, and thereafter rotating the subsequent plate product towards the floor surface. At this time, through interaction between the side downward projection 47 and the side downwardly inclined groove 43, the side protruding part 45-2 of the subsequent finishing plate product is naturally inserted into a predetermined portion of the side receiving part 40-2 of the finishing plate product which was previously installed without additionally adjusting a position in a widthwise direction. Of course, after the widthwise coupling operation has been performed, a plate product is also pushed into a neighboring plate product in a lengthwise direction so that the end protruding part 55-1 is inserted into the end receiving part 50-1. Thereby, the installation of the finishing plate product is completed.

Since the floor or wall finishing plate products using natural stone according to the third to seventh embodiments may be installed through a method which is similar to the above-mentioned construction methods, it will not be described herein. But, when the plate product is provided with the base plate made of the resin material as in the third to seventh embodiments, the plate product may be installed through the wet construction method using cement as well as the dry construction method using an adhesive.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A floor or wall finishing plate product using natural stone, comprising:

a natural-stone surface plate having a predetermined thickness, and cut to have a predetermined length and width;

a reinforcing plate cut to have a length and width corresponding to those of the natural-stone surface plate, and attached to a lower surface of the natural-stone surface plate; and a base plate cut to have a length and width which are larger than those of the natural-stone surface plate and attached to a lower surface of the reinforcing plate, an upper layer part of the base plate having a predetermined thickness being pushed horizontally at a first lengthwise side surface and a first widthwise end surface, a lower layer part having a remaining thickness being pushed horizontally at a second lengthwise side surface and a second widthwise end surface, wherein the first lengthwise side surface and the first widthwise end surface comprise a side receiving part and an end receiving part which are recessed horizontally under the reinforcing plate, and the second lengthwise side surface and the second widthwise end surface comprise a side protruding part and an end protruding part which protrude horizontally under the reinforcing plate, and the side protruding part is coupled to the side receiving part and the end protruding part is coupled to the end receiving part, so that finishing plate products are continuously horizontally coupled to each other in lengthwise and widthwise directions, wherein the base plate is made of acrylonitrile-butadiene-styrene (ABS) resin or melamine resin and formed through injection molding, and wherein the base plate has a honeycomb structure including a plurality of balanced rectangular recesses or hexagonal recesses which open downwards and upwards except for on a predetermined portion of an edge of the base plate, and wherein each downwardly directed recess has lateral edges aligned with corresponding upwardly directed recesses.

2. The floor or wall finishing plate product according to claim 1, wherein the reinforcing plate is selected from among the group consisting of an aluminum composite plate having a plastic plate and two aluminum plates attached to upper and lower surfaces of the plastic plate, a fiber glass board, a cellulose fiber reinforced cement (CRC) board, a magnesium board, and a urethane foam board.

3. The floor or wall finishing plate product according to claim 1, wherein the base plate is provided with a plurality of vent holes which are arranged according to a predetermined arranging rule in such a way as to penetrate vertically.

4. A floor or wall finishing plate product using natural stone, comprising:
   a natural stone surface plate having a predetermined thickness, and cut to have a predetermined length and width;
   a reinforcing plate cut to have a length and width corresponding to those of the natural stone surface plate, and attached to a lower surface of the natural stone surface plate; and
   a base plate cut to have a length and width which are larger than those of the natural stone surface plate and attached to a lower surface of the reinforcing plate, the base plate comprising a side receiving part and an end receiving part which are recessed horizontally in a first lengthwise side surface and a first widthwise end surface, and comprising a side protruding part and an end protruding part which protrude horizontally from a second lengthwise side surface and a second widthwise end surface,
   wherein the side protruding part is coupled to the side receiving part and the end protruding part is coupled to the end receiving part, so that finishing plate products are continuously horizontally coupled to each other in lengthwise and widthwise directions,
   wherein the base plate is made of acrylonitrile-butadiene-styrene (ABS) resin or melamine resin and formed through injection molding, and wherein the base plate has a honeycomb structure including a plurality of balanced rectangular recesses or hexagonal recesses which open downwards and upwards except for on a predetermined portion of an edge of the base plate, and wherein each downwardly directed recess has lateral edges aligned with corresponding upwardly directed recesses.

5. The floor or wall finishing plate product according to claim 4, wherein the reinforcing plate is selected from among the group consisting of an aluminum composite plate having a plastic plate and two aluminum plates attached to upper and lower surfaces of the plastic plate, a fiber glass board, a cellulose fiber reinforced cement (CRC) board, a magnesium board, and a urethane foam board.

6. The floor or wall finishing plate product according to claim 4, wherein each of the side receiving part and the end receiving part is formed to be surrounded by an upper wall, a side wall and a lower wall, the upper wall being positioned further inside than the lower wall.

7. The floor or wall finishing plate product according to claim 6, wherein each of the side receiving part and the end receiving part is formed such that a section of a predetermined dimension with the upper wall eliminated and a section of a predetermined dimension with the lower wall eliminated repeatedly alternate with each other.

8. The floor or wall finishing plate product according to claim 4, wherein the base plate is provided with a plurality of vent holes which are arranged according to a predetermined arranging rule in such a way as to penetrate vertically.

* * * * *